(12) United States Patent
Higashi

(10) Patent No.: US 9,690,269 B2
(45) Date of Patent: Jun. 27, 2017

(54) CONTROLLER AND PROCESS MONITORING METHOD INCLUDING MONITORING OF PROCESS EXECUTION SEQUENCE

(71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventor: Makoto Higashi, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 405 days.

(21) Appl. No.: 14/365,876

(22) PCT Filed: Dec. 14, 2012

(86) PCT No.: PCT/JP2012/082440
§ 371 (c)(1),
(2) Date: Jun. 16, 2014

(87) PCT Pub. No.: WO2013/089210
PCT Pub. Date: Jun. 20, 2013

(65) Prior Publication Data
US 2015/0134083 A1     May 14, 2015

(30) Foreign Application Priority Data
Dec. 16, 2011   (JP) .................................. 2011-276395

(51) Int. Cl.
*G06F 19/00*   (2011.01)
*G05B 15/02*   (2006.01)
(Continued)

(52) U.S. Cl.
CPC .............. *G05B 15/02* (2013.01); *G06F 11/28* (2013.01); *G06F 11/30* (2013.01)

(58) Field of Classification Search
CPC ................................. G06F 11/28; G05B 15/02
See application file for complete search history.

(56) References Cited

U.S. PATENT DOCUMENTS 3,713,095 A * 1/1973 McPherson ............. G06F 11/28
                                                               714/50
4,410,938 A * 10/1983 Higashiyama ........ F02D 41/263
                                                               701/102
(Continued)

FOREIGN PATENT DOCUMENTS

JP       A 2000-339197       12/2000
JP       A 2003-44323         2/2003
(Continued)

OTHER PUBLICATIONS

Mar. 19, 2013 Search Report issued in International Patent Application No. PCT/JP2012/082440 (with translation).

*Primary Examiner* — Michael D Masinick
(74) *Attorney, Agent, or Firm* — Oliff PLC

(57) ABSTRACT

A controller and processing method includes executing, using an execution unit, a plurality of processes for controlling an operation of a device, monitoring an execution sequence of the processes executed by the execution unit, storing execution sequence information regarding multiple series based on identification information assigned to the processes, outputting the identification information assigned to the processes to be executed by the execution unit, specifying, for each series, the identification information of the processes to be executed by the execution unit, based on the execution sequence information regarding the multiple series stored, determining whether or not the identification information output in the output step matches the identifi- (Continued)

cation information specified for each series in the specifying step, and giving notification to an error handling unit if it is determined in the determination step that there is no match.

21 Claims, 12 Drawing Sheets

(51) Int. Cl.
  *G06F 11/28* (2006.01)
  *G06F 11/30* (2006.01)

(56) References Cited

U.S. PATENT DOCUMENTS

| | | | | |
|---|---|---|---|---|
| 5,341,497 A | * | 8/1994 | Younger | G06F 11/28 714/51 |
| 6,044,458 A | * | 3/2000 | Rinkenberger | G06F 11/28 712/227 |
| 7,424,641 B2 | * | 9/2008 | Sundaram | G06F 11/28 700/81 |
| 2003/0110322 A1 | * | 6/2003 | Wolrich | G06F 13/1626 710/5 |
| 2008/0263521 A1 | * | 10/2008 | Neumann | G06F 8/34 717/125 |
| 2009/0082943 A1 | * | 3/2009 | Sugiyama | F02D 41/26 701/103 |
| 2010/0205414 A1 | * | 8/2010 | Miller | G06F 11/28 712/227 |
| 2015/0134083 A1 | * | 5/2015 | Higashi | G06F 11/28 700/26 |

FOREIGN PATENT DOCUMENTS

| | | |
|---|---|---|
| JP | A 2009-113618 | 5/2009 |
| JP | A 2010-9296 | 1/2010 |

* cited by examiner

| SERIES NUMBER | LEADING ID | LAST ID | MONITORING TARGET SERIES |
|---|---|---|---|
| 1 | 01 | 04 | PROCESS A01 TO PROCESS A04 IN CONTROL APP A |
| 2 | 05 | 07 | PROCESS B01 TO PROCESS B03 IN CONTROL APP B |
| ⋮ | ⋮ | ⋮ | ⋮ |

| SERIES NUMBER | LEADING ID | REPEAT LEADING ID | LAST ID | MONITORING TARGET SERIES |
|---|---|---|---|---|
| 1 | 01 | 02 | 04 | PROCESS A01 TO PROCESS A04 IN CONTROL APP A |
| 2 | 05 | 07 | 07 | PROCESS B01 TO PROCESS B03 IN CONTROL APP B |
| ⋮ | ⋮ | ⋮ | ⋮ | ⋮ |

| WATCHDOG PROCESS ID | VALUE OF OUTPUT SIGNAL TO WATCHDOG MONITORING UNIT |
|---|---|
| 01 | [0] |
| 04 | [1] |

FIG. 15

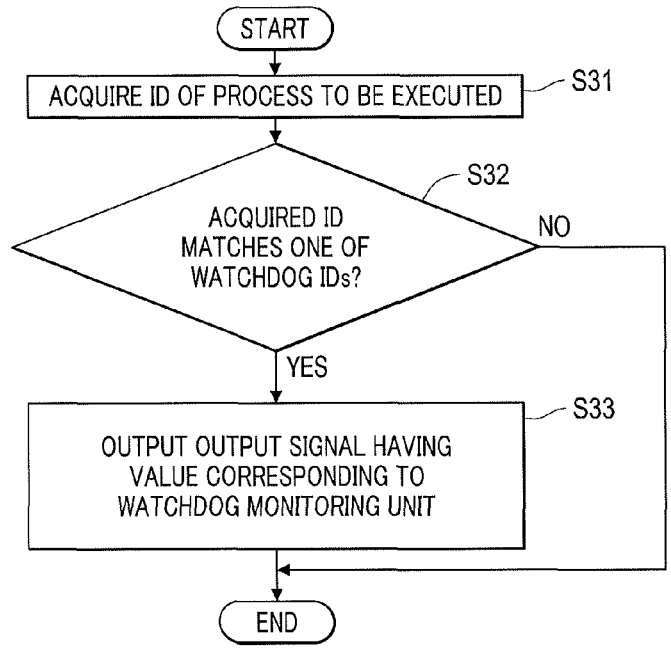

FIG. 16

| DEVICE STATE | PROCESSING SERIES THAT MAY BE EXECUTED (SERIES TO BE MONITORING TARGET) | |
|---|---|---|
| | PROCESSES A01 TO A04 (ID01 TO 04) | PROCESSES B01 TO B03 (ID05 TO 07) |
| ENGINE KEY HAS NOT BEEN INSERTED | O | X |
| ENGINE KEY IS AT OFF POSITION | O | X |
| ENGINE KEY IS AT ACC POSITION | O | X |
| ENGINE KEY IS AT ON POSITION | O | O |
| ENGINE KEY IS AT START POSITION | O | O |
| NOTE) SIGN "O" INDICATES MONITORING TARGET, AND SIGN "X" INDICATES NON-MONITORING TARGET | | |

CONTROLLER AND PROCESS MONITORING METHOD INCLUDING MONITORING OF PROCESS EXECUTION SEQUENCE

CROSS-REFERENCE TO RELATED APPLICATIONS

This application claims priority to International Application No. PCT/JP2012/082440, filed on Dec. 14, 2012, and to Japanese Patent Publication No. 2011-276395, filed on Dec. 16, 2011, the disclosures of both of which are incorporated herein by reference in their entireties.

TECHNICAL FIELD

Embodiments of the present application relate to a controller and a process monitoring method for monitoring an execution sequence of a plurality of processes for controlling an operation of a device.

BACKGROUND

In recent years, in the field of automobiles, the functionality of vehicles has been improving more and more. With this improvement, a variety of devices are now mounted in vehicles, and a large number of controllers for controlling these in-vehicle devices, or so-called ECUs (Electronic Control Units) are also mounted. For example, various ECUs are mounted in vehicles, including a body ECU for performing control for turning on and off a compartment light or a headlight, sounding an alarm, and locking/unlocking doors, in accordance with switch operations or the like performed by a passenger, a meter ECU for controlling operations of meters and the like installed near a driver seat, and a navigation ECU for performing control of a car navigation device or the like.

An ECU is constituted by a processing unit such as a microcomputer, and control of in-vehicle devices is realized as a result of the ECU reading and executing a control program stored in a ROM (Read Only Memory). In general, a control program to be executed by a single ECU is constituted by a plurality of application programs for controlling a plurality of in-vehicle devices connected to an input-output interface included in the ECU. An ECU cooperates with other ECUs through an in-vehicle LAN, and an application program for controlling an in-vehicle device connected to an input-output interface included in another ECU is included in the control program in some cases.

The control program constituted by a plurality of application programs transmits control signals to an actuator for operating an in-vehicle device and operates the in-vehicle device in a predetermined sequence, based on information from various sensors mounted in the vehicle, switch operation signals provided by a passenger, and the like. Here, processing for acquiring various kinds of sensor information, processing for acquiring the switch operation signals, and processing for controlling the in-vehicle device are realized by a plurality of processes based on a program created for each processing unit being combined and sequentially executed.

An ECU makes a plan of an execution sequence of a plurality of processes for operating an in-vehicle device based on various kinds of sensor information, the switch operation signals, and control signals from other ECUs, and executes the processes based on the plan. For example, in the control for smart keyless entry, the body ECU, upon receiving a first communication signal serving as a trigger from a portable key approaching the vehicle, needs to execute a plurality of processes in a prescribed sequence conforming to an engine start procedure and a communication protocol between the portable key and an in-vehicle communication unit. Usually, the ECU advances the processes in accordance with the procedure planned in conformity with prescribed rules. However, if an unexpected phenomenon occurs, such as a communication error between the portable key and the in-vehicle communication unit or an instantaneous power interruption, and the ECU deviates from the planned procedure, a malfunction of the in-vehicle device will be caused.

As described above, in the control program including a plurality of application programs for controlling a plurality of in-vehicle devices, the execution sequence of processes is prescribed for each application program in some cases. In such cases, the ECU needs to monitor whether or not the processes are proceeding in the prescribed execution sequences in multiple series of processes, and if a deviation from the execution sequences occurs, the ECU needs to be able to promptly restore the execution sequence.

JP 2010-009296A describes a monitoring device including an ID register, a log register group, a control unit, and a watchdog timer. The ID register stores identification information assigned to processing tasks to be executed. The identification information of a first processing task contains an ID of the first processing task and an ID of a second processing task that is to be executed before the first processing task (hereinafter referred to as a "preceding processing task ID"). The control unit holds the identification information of each processing task to be executed and the identification information of the previously executed processing task in the register, and monitors whether or not the execution sequence of the tasks is normal, based on the preceding processing task ID in the identification information of the processing task to be executed and the previously executed processing task ID. The log register group stores the identification information and monitoring result information as log information in time series. If a failure occurs in a program execution state and time-out of the watchdog timer is detected, the log information stored in the log register group is saved in a storage device, and the cause of the failure occurrence can thereby be promptly investigated based on the saved log information.

However, with the monitoring device described in JP 2010-009296A, although monitoring can be performed in conformity with the prescribed execution sequence of a single series of processes by holding the identification information of each processing task to be executed and the identification information of the previously executed processing task in the register and performing the monitoring, a problem arises in that procedures of processes in multiple series cannot be monitored.

Moreover, with the monitoring device described in JP 2010-009296A since the identification information assigned to each process contains the ID of this processing task and the ID of the preceding processing task, the data length of the identification information is long, which requires an extra storage area in a ROM or the like for storing each processing program. Since the identification information assigned to each process contains the ID of this processing task and the ID of the preceding processing task, the ID of each processing task and the ID of the preceding processing task needs to be extracted individually from the identification information during the monitoring, and the processing time becomes longer due to the time taken for this extraction processing.

In addition, in the monitoring device described in JP 2010-009296A the identification information assigned to the previously executed process is held in the register. The preceding processing task ID in the identification information assigned to the previously executed processing is held even though it is not necessary for the monitoring, and an extra register is required. Furthermore, the preceding processing task ID in the identification information assigned to the previously executed processing is unnecessary for the monitoring, and if processing for deleting this unnecessary portion is added, the register can be minimized, but the processing time becomes longer due to the deleting processing.

SUMMARY

Embodiments of the present application have been made in view of the foregoing situation, and an object thereof is to provide a controller and a process monitoring method with which execution sequences in multiple series can be monitored.

A controller according to embodiments of the present application is a controller equipped with an execution unit configured to execute a plurality of processes for controlling an operation of a device, a monitoring unit configured to monitor an execution sequence of the processes executed by the execution unit, and an error handling unit. The controller also including: a storage unit configured to store execution sequence information regarding multiple series based on identification information assigned to the processes, wherein the execution unit includes an output unit for outputting the identification information assigned to the processes to be executed, and the monitoring unit includes: a specifying unit for specifying, for each series, the identification information of the processes to be executed by the execution unit, based on the execution sequence information regarding the multiple series stored in the storage unit; a determination unit for determining whether or not the identification information output from the output unit matches the identification information specified for each series by the specifying means; and a notifying unit for giving notification to the error handling unit if it is determined by the determination unit that there is no match.

In the controller according to embodiments of the present application, the storage unit stores, for each series, a leading sequence number and a last sequence number in the execution sequence of the plurality of processes, as the execution sequence information, the output unit outputs a sequence number serving as the identification information assigned to the processes to be executed, and the specifying unit sequentially and repeatedly specifies, for each series, numbers from the leading sequence number to the last sequence number, as the identification information of the processes to be executed by the execution unit.

In the controller according to embodiments of the present application, the storage unit stores, for each series, a leading sequence number, a last sequence number, and a repeat leading sequence number in the execution sequence of the plurality of processes, as the execution sequence information, the output unit outputs a sequence number serving as the identification information assigned to the processes to be executed, and the specifying unit sequentially specifies, for each series, numbers from the leading sequence number to the last sequence number, and further, sequentially and repeatedly specifies numbers from the repeat leading sequence number to the last sequence number, as the identification information of the processes to be executed by the execution unit.

In the controller according to embodiments of the present application, the error handling unit gives the execution unit an instruction to restart the processes, based on the notification from the notifying unit, and the notifying unit, after giving the notification to the error handling unit, stops notification to the error handling unit until the execution unit executes a process to which a leading sequence number is assigned.

In the controller according to embodiments of the present application, the monitoring unit includes a signal output unit for outputting a signal indicating that the processes are continuing, when specific identification information is output from the output unit, and the controller comprises a second monitoring unit configured to notify the execution unit of restart of the processes if the signal is not output within a predetermined time period.

In the controller according to embodiments of the present application, the storage unit stores a predetermined state of the device in association with a series, among the multiple series, that includes the identification information of the processes that may be executed when in the predetermined state, and when the device is in the predetermined state, the specifying unit specifies the identification information of the processes to be executed by the execution unit, based on the execution sequence information regarding the series stored in the storage unit in association with the predetermined state.

A process monitoring method according to embodiments of the present application is a process monitoring method for executing, using an execution unit, a plurality of processes for controlling an operation of a device and monitoring an execution sequence of the processes executed by the execution unit. The method further including: storing execution sequence information regarding multiple series based on identification information assigned to the processes; outputting the identification information assigned to the processes to be executed by the execution unit; specifying, for each series, the identification information of the processes to be executed by the execution unit, based on the execution sequence information regarding the multiple series stored during the storing; determining whether or not the identification information output in the output step matches the identification information specified for each series; and notifying, by giving a notification, an error handling unit if it is determined during the determining that there is no match.

According to embodiments of the present application, the execution sequence information regarding the multiple series based on the identification information assigned to the plurality of processes is stored in the storage unit, and, in the execution unit, the output unit outputs the identification information assigned to the processes to be executed. In the monitoring unit, the specifying unit specifies, for each series, the identification information of the processes to be executed by the execution unit, based on the execution sequence information regarding the multiple series stored in the storage unit, and the determination unit determines whether or not the identification information output from the output unit matches the identification information specified for each series by the specifying means. The notifying unit gives notification to the error handling unit if it is determined by the determination unit that there is no match. With this configuration, in the case where the execution sequences in multiple series are prescribed, the execution sequences can be monitored for each series.

According to embodiments of the present application, the storage unit stores, for each series, a leading sequence number and a last sequence number in the execution sequence of the plurality of processes, as the execution sequence information, and the output unit outputs a sequence number serving as the identification information assigned to the processes to be executed. The specifying unit sequentially and repeatedly specifies, for each series, the leading sequence number to the last sequence number, as the identification information of the processes to be executed by the execution unit. With this configuration, since the execution sequence information stored in the storage unit is the leading sequence number and the last sequence number in the execution sequences in the multiple series, the data volume of the execution sequence information to be stored can be reduced.

According to embodiments of the present application, the storage unit stores, for each series, a leading sequence number, a last sequence number, and a repeat leading sequence number in the execution sequence of the plurality of processes, as the execution sequence information, and the output unit outputs a sequence number serving as the identification information assigned to the processes to be executed. The specifying unit sequentially specifies, for each series, the leading sequence number to the last sequence number, and further, sequentially and repeatedly specifies the repeat leading sequence number to the last sequence number, as the identification information of the processes to be executed by the execution unit. With this configuration, the processes can be monitored based on the prescribed rule of the execution sequence that is determined such that the repeat leading sequence number is different from the leading sequence number at the time of starting the processes.

According to embodiments of the present application, the error handling unit gives the execution unit an instruction to restart the processes, based on the notification from the notifying unit, and the notifying unit, after giving the notification to the error handling unit, stops notification to the error handling unit until the execution unit executes a process to which a leading sequence number is provided. With this configuration, it is possible to prevent a delay in restart due to an occurrence of an error in the repeat execution sequence before the processes are restarted.

According to embodiments of the present application, the monitoring unit outputs, using the signal output unit, a signal indicating that the processes are continuing, when specific identification information is output from the output means. The second monitoring unit notifies the execution unit of restart of the processes if the signal is not output within a predetermined time period from the signal output means. With this configuration, in the case where the processes stop for some reason, the processes can be reset.

According to embodiments of the present application, the storage unit stores a predetermined state of the device and a series, among the multiple series, that includes the identification information of a process that may be executed, that is, for which there is a certain possibility of execution, when in the predetermined state, in association with each other, and when the device is in the predetermined state, the specifying unit specifies the identification information of the processes to be executed by the execution unit, based on the execution sequence information regarding the series stored in the storage unit in association with the predetermined state. With this configuration, it is possible to cause the monitoring of the execution sequence not to be performed on the processes that are not executed when the device is in a predetermined state.

According to embodiments of the present application, the execution sequence information regarding the multiple series based on the identification information assigned to the plurality of processes is stored in the storage unit, and, in the execution unit, the output unit outputs the identification information assigned to the processes to be executed. In the monitoring unit, the specifying unit specifies, for each series, the identification information of the processes to be executed by the execution unit, based on the execution sequence information regarding the multiple series stored in the storage unit, and the determination unit determines whether or not the identification information output from the output unit matches the identification information specified for each series by the specifying means. The notifying unit gives notification to the error handling unit if it is determined by the determination unit that there is no match. For this reason, in the case where the execution sequences in multiple series are prescribed, the execution sequences can be monitored for each series.

BRIEF DESCRIPTION OF DRAWINGS

FIG. 15 is a flowchart showing a procedure of processing for outputting a signal to the watchdog monitoring unit.

FIG. 16 is a schematic diagram for illustrating processing series that may be performed with respect to predetermined states of a device in a controller according to Embodiment 5.

DETAILED DESCRIPTION

Embodiment 1

Figure 1:
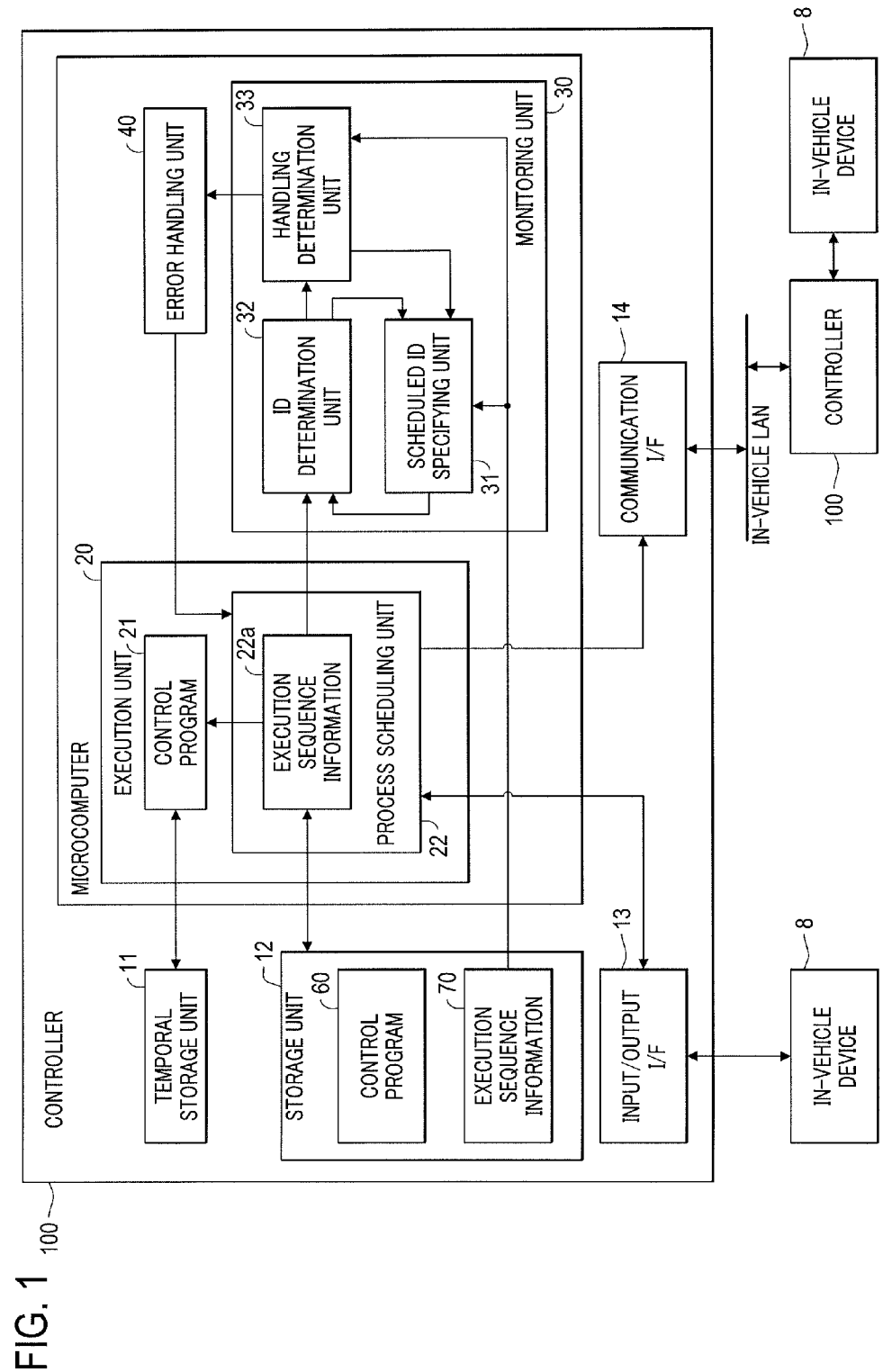
FIG. 1 is a block diagram showing a configuration of a controller according to Embodiment 1.
Figure 2:
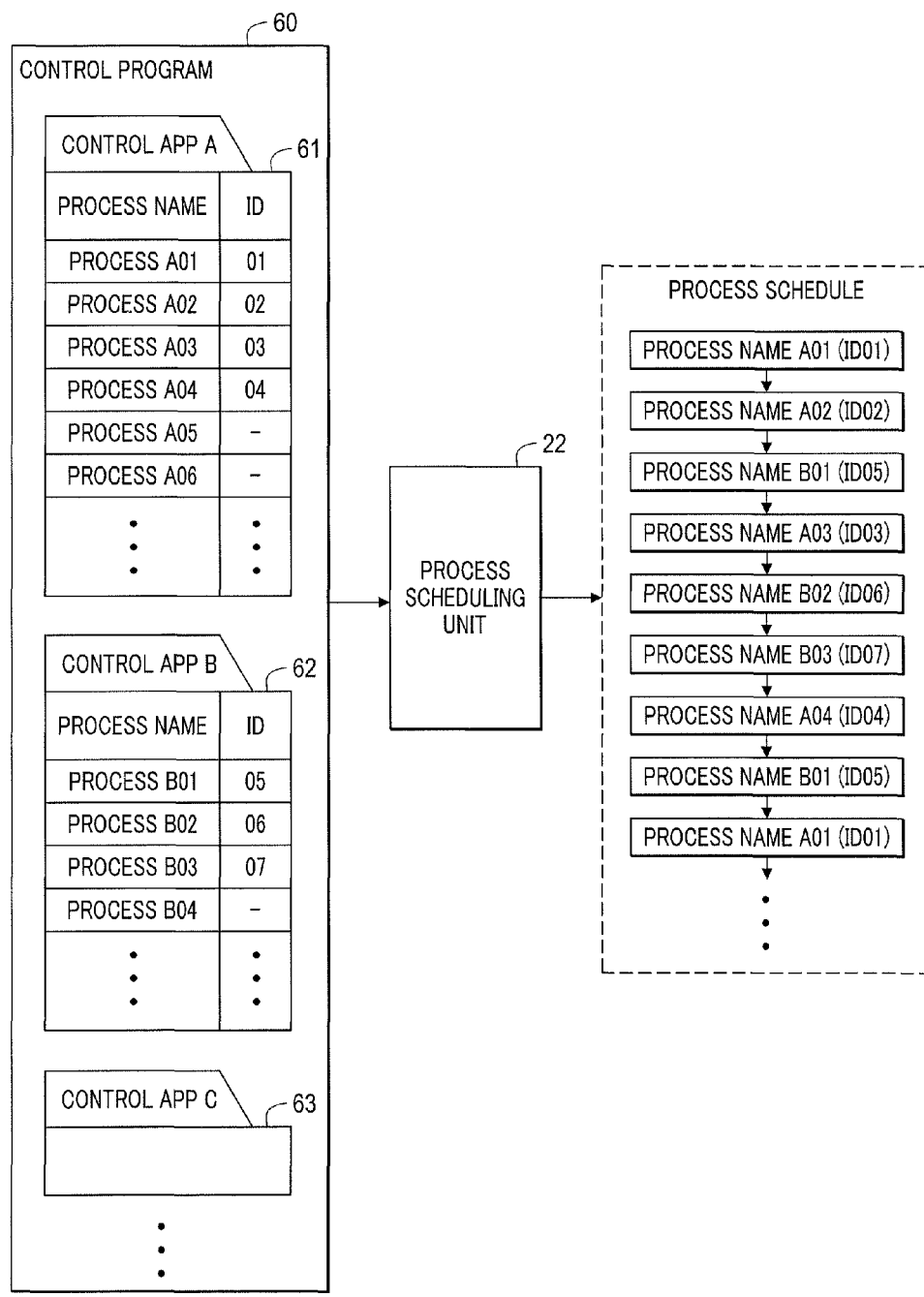
FIG. 2 is a schematic diagram for illustrating a process schedule of a control program provided by a process scheduling unit in FIG. 1.
Figures 3, 4:
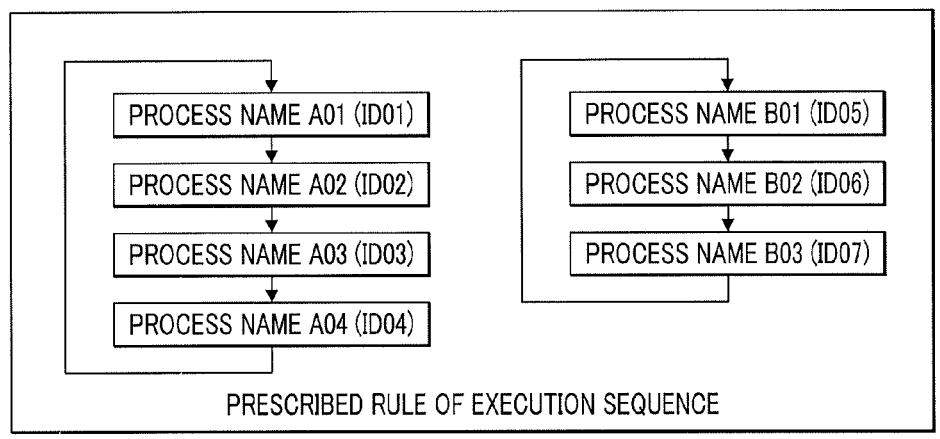
FIG. 3 is a schematic diagram for illustrating prescribed execution sequences in multiple series.
FIG. 4 is a table showing execution sequence information regarding multiple series based on identification information assigned to processes.

FIG. 1 is a block diagram showing a configuration of a controller 100 according to Embodiment 1, FIG. 2 is a schematic diagram for illustrating a process schedule of a control program provided by a process scheduling unit 22 in FIG. 1, FIG. 3 is a schematic diagram for illustrating prescribed execution sequences in multiple series, and FIG. 4 is a table showing execution sequence information 70 regarding multiple series based on identification information assigned to processes. The present embodiment describes an example in which the controller 100 is an in-vehicle controller. The controller 100 performs control for a connected in-vehicle device 8, exchanges information with another controller 100 that is communicably connected via an in-vehicle LAN, and controls an in-vehicle device 8 connected to the other controller 100. The controller 100 includes a microcomputer 10, a temporary storage unit 11, a storage unit 12, an input-output interface (hereinafter referred to as an "input-output I/F") 13, and a communication interface (hereinafter referred to as a "communication I/F") 14. The controller 100 controls the in-vehicle device 8 connected to the input-output I/F 13, such as a compartment light, a headlight, an alarm, a door locking mechanism, meters, or a car navigation device.

The microcomputer 10 includes an execution unit 20, a monitoring unit 30, and an error handling unit 40. The execution unit 20 is constituted by, for example, a CPU (Central Processor Unit) for performing arithmetic processing, and controls the in-vehicle device 8 connected to the input-output I/F 13 by reading out and executing a control program 60 that is stored in advance in the storage unit 12. The storage unit 12 is constituted by a rewritable nonvolatile memory device such as an EEPROM (Electrically Erasable Programmable ROM), for example. The storage unit 12 stores in advance the control program 60, execution sequence information 70 of processes, and the like. The execution unit 20 advances processes while storing temporal data generated during computation in the course of control processing in the temporal storage unit 11. The temporal storage unit 11 is constituted by a memory device such as an SRAM (Static Random Access Memory) or a DRAM (Dynamic Random Access Memory), and temporarily stores various kinds of data or the like that is generated in the course of processes performed by the execution unit 10.

The input-output I/F 13 outputs a control signal or the like given from the execution unit 20 to the in-vehicle device 8, and gives information that is input from the in-vehicle device 8 to the execution unit 20. The communication I/F 14 is connected to the other controller 100 via the in-vehicle LAN, and transmits and receives data to and from the other controller 100 in accordance with a protocol such as CAN (Controller Area Network). The communication I/F 14 transmits data given from the execution unit 20 and gives data received from the other controller 100 to the execution unit 20. Thus, the controller 100 can acquire information obtained from the in-vehicle device 8 connected to the other controller 100 by means of communication performed by the communication I/F 14, and can also perform control by transmitting the control signal or the like to the in-vehicle device 8 connected to the other controller 100.

The execution unit 20 is provided with a processing unit 21 and a process scheduling unit 22. The processing unit 21 sequentially executes a plurality of processes that constitute the control program 60 and controls the in-vehicle device 8. The processing unit 21 stores data generated in the course of processing in the temporary storage unit 11. The process scheduling unit 22 plans a process schedule for executing a plurality of processes for operating the in-vehicle device 8, based on sensor information and a switch operation signal that are input from the input-output I/F 13, a control signal from the other controller 100 that is input from the communication I/F 14, and the like.

The process scheduling unit 22 plans the process schedule such as one shown in FIG. 2, for example. The control program 60 is constituted by a control application program (hereinafter referred to as a "control app") A 61, a control app B 62, a control app C 63, etc., in order to control a plurality of in-vehicle devices 8. Each control app is constituted by a plurality of processes, and an execution sequence of the processes is prescribed as in the aforementioned control program for realizing smart keyless entry. The execution sequence of the processes may be prescribed for all processes, or for a part of the processes. An identification information ID is assigned to each of the processes whose execution sequence is prescribed, and no identification information ID for execution sequence monitoring is assigned to the processes whose execution sequence is not prescribed.

For example, as shown in FIG. 3, regarding the control app A 61, the execution sequence is prescribed such that a process A01 is executed initially, then processes A02, A03, and A04 are executed in this sequence, the procedure returns to the process A01 after the process A04 is executed, and these processes must be repeatedly executed in the same sequence. The identification information IDs 01 to 04 are respectively assigned to the processes A01 to A04 whose execution sequence is prescribed. On the other hand, no identification information ID for execution sequence monitoring is assigned to the processes A05 and A06 whose execution sequence is not prescribed. Similarly, regarding the control app B 62 as well, the execution sequence is prescribed such that a process B01 is executed initially, then processes B02 and B03 are executed in this sequence, the procedure returns to the process B01 after the process B03 is executed, and these processes must be repeatedly executed in the same sequence. The identification information IDs 05 to 07 are respectively assigned to the processes B01 to B03 whose execution sequence is prescribed. On the other hand, no identification information ID for execution sequence monitoring is assigned to the process B04 whose execution sequence is not prescribed.

The process scheduling unit 22 plans a schedule in which the processes related to the control app A 61 and the processes related to the control app B 62 are mixed and sequentially executed (see FIG. 2). Looking only at the processes related to the control app A 61, the process scheduling unit 22 makes the plan such that the processes A01 to A04 are executed in this sequence as prescribed. Furthermore, looking only at the processes related to the control app B 62, the process scheduling unit 22 makes the plan such that the processes B01 to B03 are executed in this sequence as prescribed.

The identification information may be assigned to a plurality of processes whose execution sequence is prescribed is a group of numbers that is provided for each series, the numbers being integer values with a fixed increment value C (C is an integer) in ascending or descending order. Moreover, every piece of identification information is set uniquely without duplication. In the example shown in FIG. 2, the increment value C is 1, the identification information is ascending numbers starting from "01". Specifically, a group of numbers, such as 01, 02, 03, 04, 05, 06, 07, . . . , is created and used as the identification information. The identification information IDs of the processes A01 to A04 in a processing series in which the execution sequence is prescribed in the control app A 61 are 01 to 04, respectively. Also, the identification information IDs of the processes B01 to B03 in a processing series in which the execution sequence is prescribed in the control app B 62 are 05 to 07, respectively. Note that the identification information IDs in different series may be discontinuous. That is to say, the identification information IDs of the processes B01 to B03 may also be 11 to 13, respectively, for example. Note that no identification number for execution sequence monitoring is assigned to the processes whose execution sequence is not prescribed (processes A05, A06, and B04). The increment value C may be different in each series.

Information regarding the execution sequences in the multiple series based on the identification information assigned to the processes is stored as execution sequence information 70 in the storage unit 12. As shown in FIG. 4, the execution sequence information 70 is information containing a leading ID and a last ID in a repeat loop of each series in which the execution sequence is prescribed, and a series number. That is to say, the execution sequence information 70 contains the leading ID "01" and the last ID "04" as information regarding the control app A 61, and contains the leading ID "05" and the last ID "07" as information regarding the control app B 62.

The processing unit 21 sequentially performs the processes based on the process schedule planned by the process scheduling unit 22. The process scheduling unit 22 includes an ID notification unit 22a. The ID notification unit 22a acquires the identification information of the processes to be executed, and gives notification to the monitoring unit 30.

The monitoring unit 30 is provided with a scheduled ID specifying unit 31, an ID determination unit 32, and a handling determination unit 33. The scheduled ID specifying unit 31 specifies the identification information ID of the process scheduled to be executed next in the execution sequence, based on the execution sequence information 70 stored in the storage unit 12. As shown in FIGS. 3 and 4, the execution sequence is prescribed for each series, and therefore the monitoring unit 30 does not perceive which series of processes is to be executed by the execution unit 20. For this reason, the scheduled ID specifying unit 31 specifies the identification information of the processes to be executed in the respective series. Specifically, the scheduled ID specifying unit 31 initially specifies two identification information IDs, namely the leading ID "01" in the control app A 61 series and the leading ID "05" in the control app B 62 series, as scheduled execution IDs. The scheduled ID specifying unit 31 outputs the specified scheduled execution IDs in the respective series to the ID determination unit 32. Furthermore, the scheduled ID specifying unit 31 performs processing for adding the increment value C to the scheduled execution IDs in the respective series and sequentially specifying the scheduled execution IDs, and after finishing specifying the last ID in each series, the scheduled ID specifying unit 31 specifies the leading ID again.

The ID determination unit 32 determines whether or not the identification information ID that the ID determination unit 32 is notified of from the ID notification unit 22a matches one of the identification information IDs in the respective series that are input from the scheduled ID specifying unit 31. If the ID determination unit 32 determines that there is a match, the ID determination unit 32 outputs the matched identification information ID to the scheduled ID specifying unit 31. The scheduled ID specifying unit 31 adds the increment value C to the specified scheduled execution ID in the series including the identification information ID that is input from the ID determination unit 32, and outputs the resulting value as a new scheduled execution ID to the ID determination unit 32. On the other hand, if the ID determination unit 32 determines that there is no match, the ID determination unit 32 outputs the identification information ID that the ID determination unit 32 is notified of from the ID notification unit 22a to the handling determination unit 33.

The handling determination unit 33, upon acquiring the identification information ID from the ID determination unit 32, specifies which series, i.e., which of the control app A 61 and the control app B 62 includes the process indicated by the identification information ID, and notifies the error handling unit 40 of the series number and the identification information ID. For example, if the identification information ID acquired from the ID determination unit 32 is "06", it can be found, based on the execution sequence information 70, that an execution sequence error has occurred in the series with the series number 2, and therefore the handling determination unit 33 notifies the error handling unit 40 of the series number "2" and the identification information ID "06".

The error handling unit 40 performs predetermined error handling based on the series number and the identification information ID that are input from the handling determination unit 33. The predetermined error handling may include processing for saving data in a process under execution and reset processing for restarting the processes of a control app from the beginning, for example.

Figure 5:
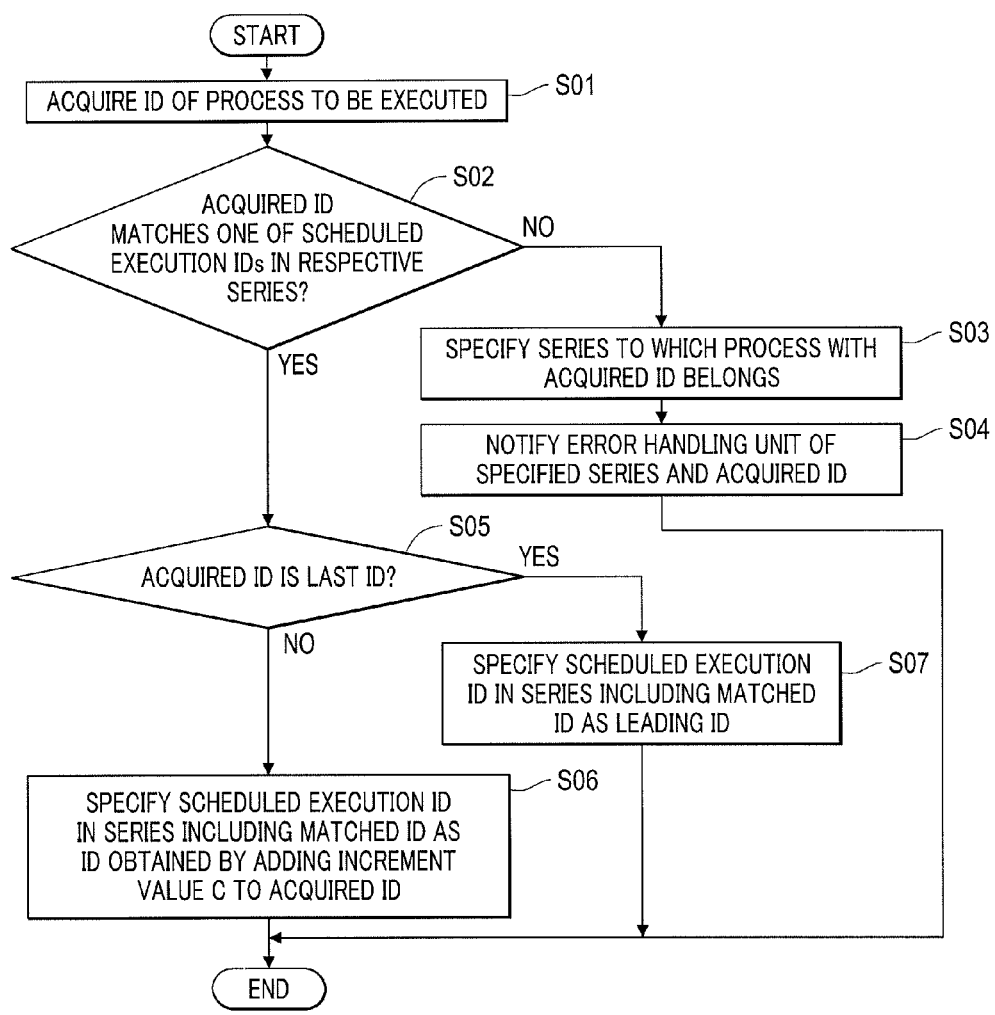
FIG. 5 is a flowchart showing a procedure of execution sequence monitoring processing performed by a monitoring unit.

Next, execution sequence monitoring processing performed by the monitoring unit 30 will be described. FIG. 5 is a flowchart showing a procedure of execution sequence monitoring processing performed by the monitoring unit 30. When the controller 100 is initially started, data to be used in each unit is set to a preset value or the like. When the controller 100 is started, the monitoring unit 30 reads, for the respective series, the leading IDs from the execution sequence information 70 using the scheduled ID specifying unit 31, outputs the read leading IDs as the scheduled execution IDs to the ID determination unit 32, and starts monitoring processing.

The monitoring unit 30 acquires the identification information ID of the process to be executed that the ID determination unit 32 is notified of from the ID notification unit 22a, using the ID determination unit 32 (step S01). The ID determination unit 32 determines whether or not the identification information ID acquired from the ID notification unit 22a matches any of the scheduled execution IDs in the respective series that are input from the scheduled ID specifying unit 31 (step S02). If the ID determination unit 32 determines that there is no match (S02: NO), the ID determination unit 32 outputs the identification information ID that the ID determination unit 32 is notified of from the ID notification unit 22a to the handling determination unit 33, and the handling determination unit 33, upon acquiring the identification information ID from the ID determination unit 32, specifies the control app series to which the process with this identification information ID belongs (step S03). The handling determination unit 33 notifies the error handling unit 40 of the series number of the specified series and the acquired identification information ID (step S04), and the monitoring processing performed with respect to the single identification information ID that the ID determination unit 32 is notified of from the ID notification unit 22a ends. Note that the error handling unit 40 performs predetermined error handling, based on the series number and the identification information ID that are input from the handling determination unit 33.

For example, it is assumed that the scheduled execution IDs output by the scheduled ID specifying unit 31 to the ID determination unit 32 are "01" in the control app A 61 series and "05" in the control app B 62 series, and the identification information ID acquired by the ID determination unit 32 from the ID notification unit 22a is "06". At this time, the ID determination unit 32 determines that the identification information ID acquired from the ID notification unit 22a does not match any of the scheduled execution IDs in the respective series, and outputs the identification information ID "06" acquired from the ID notification unit 22a to the handling determination unit 33. The handling determination unit 33, upon acquiring the identification information ID "06" from the ID determination unit 32, specifies the series number "2" of the series to which the process with this identification information ID belongs. The handling determination unit 33 notifies the error handling unit 40 of the specified series number "2" and the identification information ID "06".

If the ID determination unit 32 determines in step S02 that there is a match (S02: YES), the ID determination unit 32 outputs the matched identification information ID to the scheduled ID specifying unit 31. The scheduled ID specifying unit 31, upon acquiring the identification information ID from the ID determination unit 32, determines whether or not the acquired identification information ID is the last ID (step S05). If the scheduled ID specifying unit 31 determines that the acquired identification information ID is not the last ID (S05: NO), the scheduled ID specifying unit 31 specifies the scheduled execution ID in the series including the matched identification information ID as a new ID obtained by adding the increment value C to the identification information ID acquired from the ID determination unit 32 (step S06). On the other hand, if the scheduled ID specifying unit 31 determines that the acquired identification information ID is the last ID (S05: YES), the scheduled ID specifying unit 31 specifies the scheduled execution ID in the series including the matched identification information ID as the leading ID (step S07). After processing in steps S06 and S07, the newly specified scheduled execution ID is output from the scheduled ID specifying unit 31 to the ID determination unit 32, and the monitoring processing performed with respect to the single identification information ID that the ID determination unit 32 is notified of from the ID notification unit 22a ends.

For example, it is assumed that the scheduled execution IDs output by the scheduled ID specifying unit 31 to the ID determination unit 32 are "01" in the control app A 61 series and "05" in the control app B 62 series, and the identification information ID acquired by the ID determination unit 32 from the ID notification unit 22a is "01". At this time, the ID determination unit 32 determines that the identification information ID acquired from the ID notification unit 22a matches one of the scheduled execution IDs in the respective series, and outputs the identification information ID "01" acquired from the ID notification unit 22a to the scheduled ID specifying unit 31. The scheduled ID specifying unit 31 determines that the acquired identification information ID "01" is not the last ID, specifies the scheduled execution ID in the control app A 61 series including the matched identification information ID as a new ID "02", which is obtained by adding the increment value C (=1) to the identification information ID "01" acquired from the ID determination unit 32, and outputs the new ID to the ID determination unit 32. In the determination regarding the identification information ID that the ID determination unit 32 is notified of from the ID notification unit 22a next time, the ID determination unit 32 will use "02" in the control app A 61 series and "05" in the control app B 62 series as the scheduled execution IDs.

As described above, according to the present embodiment, the storage unit 12 stores the execution sequence information 70 regarding the multiple series, and the execution unit 20 outputs the identification information ID assigned to the processes to be executed, using the ID notification unit 22a. In the monitoring unit 30, the scheduled ID specifying unit 31 specifies, for each series, the scheduled execution ID based on the execution sequence information 70 regarding the multiple series stored in the storage unit 12. The ID determination unit 32 determines whether or not the identification information ID that the ID determination unit 32 is notified of from the ID notification unit 22a matches the scheduled execution ID specified for each series by the scheduled ID specifying unit 31, and if it is determined that there is no match, the ID determination unit 32 gives notification to the error handling unit 40. Thus, the controller 100 can monitor the execution sequence for each series even in the case where the execution sequences in multiple series are prescribed.

Furthermore, according to the present embodiment, the storage unit 12 stores the leading IDs and the last IDs in the execution sequences in the multiple series as sequence numbers, and the ID notification unit 22a outputs the sequence numbers serving as the identification information IDs assigned to the processes to be executed. In the monitoring unit 30, the scheduled ID specifying unit 31 sequentially and repeatedly specifies, for each series, the sequence number based on the leading ID to the sequence number based on the last ID, as the scheduled execution IDs. Thus, since the execution sequence information stored in the storage unit 12 is the leading IDs and the last IDs in the execution sequences in the multiple series, the data volume of the execution sequence information to be stored can be reduced.

Embodiment 2

Figures 6, 7:
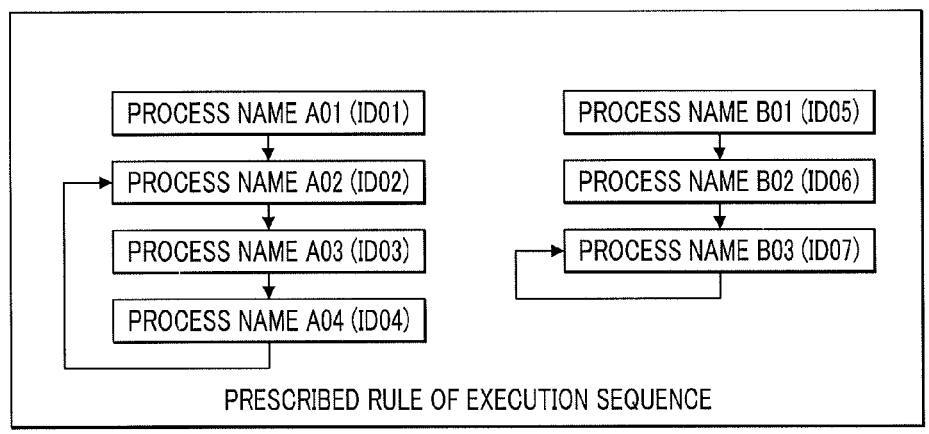
FIG. 6 is a schematic diagram for illustrating prescribed execution sequences in multiple series in a controller according to Embodiment 2.
FIG. 7 is a table showing execution sequence information regarding multiple series based on identification information assigned to processes.

In Embodiment 1, the execution sequence is prescribed such that the process with the leading ID to the process with the last ID are sequentially and repeatedly executed. However, the execution sequence may also be prescribed such that a repeat leading ID is different from the leading ID at the time of starting the processes. FIG. 6 is a schematic diagram for illustrating execution sequences in multiple series that are prescribed in the controller 100 according to Embodiment 2, and FIG. 7 is a table showing the execution sequence information 70 regarding multiple series based on identification information assigned to processes. Note that the controller 100 according to Embodiment 2 is equivalent to the controller 100 according to Embodiment 1 described based on FIGS. 1 to 5 except the feature described below, and the description thereof will be omitted for the sake of simplification.

The execution sequences prescribed for the processes A01 to A04 in the control app A 61 and the processes B01 to B03 in the control app B 62 are the execution sequences defined by repeat leading IDs. That is to say, in the control app A 61, after the processes A01 to A04 are executed in this sequence first, the procedure returns to the process A02 indicated by the repeat leading ID, and the processes A2 to A04 are repeatedly executed in this sequence. In the control app B 62, after the processes B01 to B03 are executed in this sequence first, the process B03 indicated by the repeat leading ID is repeatedly executed.

The execution sequence information 70 regarding the above-described execution sequences contains the leading ID, the repeat leading ID, the last ID, and the series number in each series, as shown in FIG. 7, and is stored in the storage unit 12. The scheduled ID specifying unit 31 in the monitoring unit 30 reads out and uses the repeat leading ID from the storage unit 12. Specifically, the scheduled execution ID need only be specified as the repeat leading ID in step S07 in the monitoring processing in FIG. 5.

As described above, according to the present embodiment, the storage unit 12 stores the sequence numbers as the leading ID, the last ID, and the repeat leading ID in the execution sequences in the multiple series. The scheduled ID specifying unit 31 sequentially specifies, for each series, the sequence number based on the leading ID to the sequence number based on the last ID as the scheduled execution IDs, and further, sequentially and repeatedly specifies the sequence number based on the repeat leading ID to the sequence number based on the last ID. Thus, in the controller 100, the processes can be monitored based on the prescribed rule of the execution sequences in which the repeat leading ID is different from the leading ID at the time of starting the processes.

Specifically, the present embodiment is preferable in the case where processing for initializing data is started when a specific condition such as power-on is satisfied, and thereafter processing for periodically acquiring various kinds of data is executed. In this case, for example, the process A01 in FIG. 6 corresponds to the data initialization processing, and the processes A02 to A04 correspond to the processing for periodically acquiring various kinds of data.

In addition, the present embodiment is also preferable to mode transition processing that is started only in a specific situation and continues to stop after transition, such as processing for returning from a sleep state. In this case, for example, the processes B01 and B02 in FIG. 6 correspond to the processing started under a specific condition, and the process B03 corresponds to the stop processing.

Embodiment 3

Figure 8:
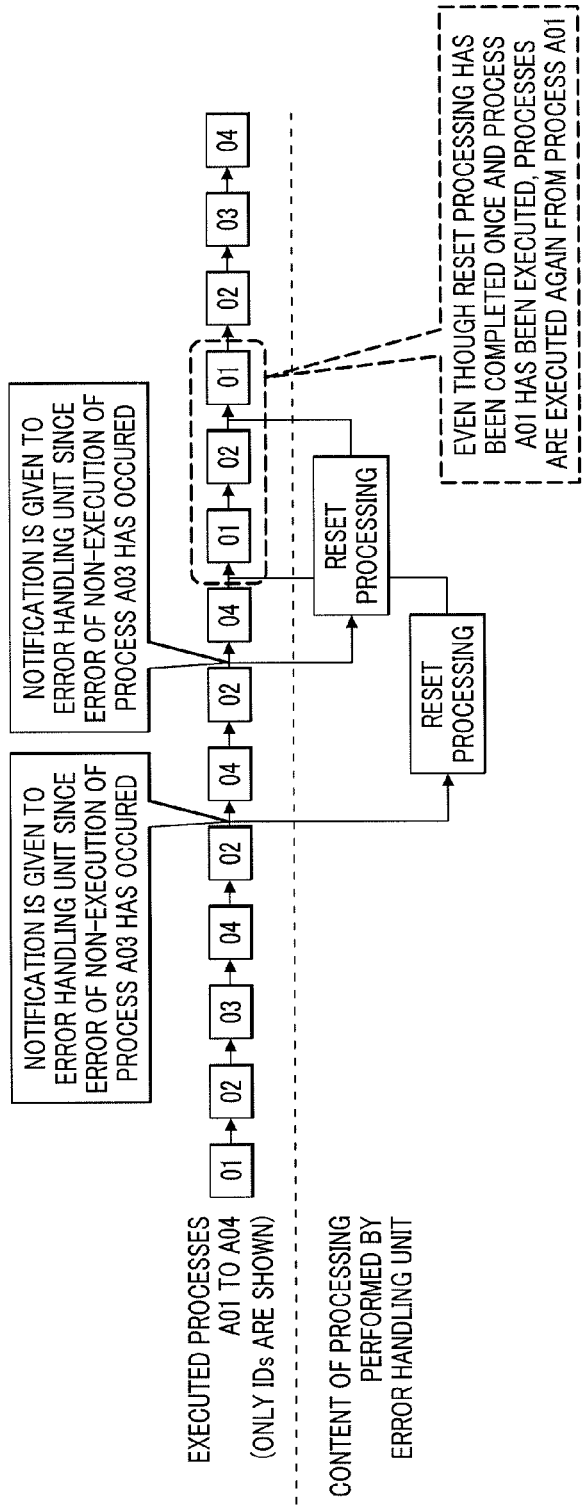
FIG. 8 is a schematic diagram for illustrating monitoring processing in the case of continuing the monitoring at the time of error handling.

In the above-described embodiments, even at the time of error handling performed by the error handling unit 40, the monitoring unit 30 continues to monitor the execution sequence of processes. However, notification to the error handling unit 40 may be prohibited until reset processing is complete. FIG. 8 is a schematic diagram for illustrating monitoring processing in the case of continuing monitoring at the time of error handling. It is assumed that in the prescribed rule of the execution sequence of the processes A01 to A04 in the control app A 61, the repeat leading ID shown in FIGS. 6 and 7 is defined.

In FIG. 8, if the process A04 is executed after the process A02 is executed, the monitoring unit 30 gives notification to the error handling unit 40 since an error of non-execution of the process A03 has occurred. The error handling unit 40 outputs a first reset processing request to the execution unit 20 based on the notification from the monitoring unit 30. When the monitoring unit 30 further continues monitoring, if the process A03 is in a state of not being executed for some reason, the phenomenon that the process A04 is similarly executed after execution of the process A02 occurs again, and the monitoring unit 30 again gives notification to the error handling unit 40. The error handling unit 40 will output a second reset processing request to the execution unit 20 based on the notification from the monitoring unit 30.

As shown in FIG. 8, even though the procedure is restarted from the process A01 due to the first reset processing request, the procedure will be restarted from the process A01 again due to the second reset processing request, which may cause a processing delay.

Figure 9:
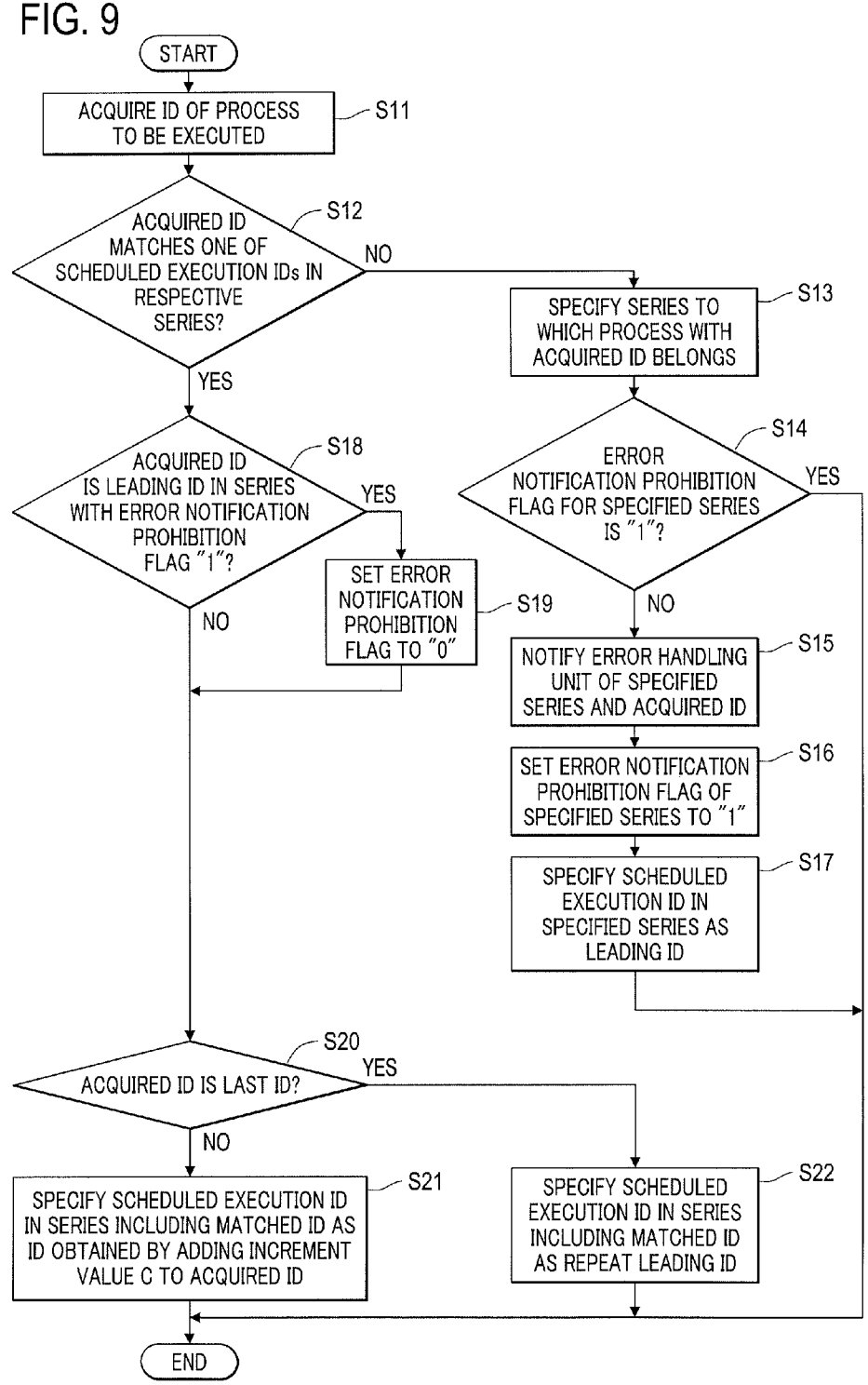
FIG. 9 is a flowchart showing a procedure of execution sequence monitoring processing performed by a monitoring unit according to Embodiment 3.
Figure 10:
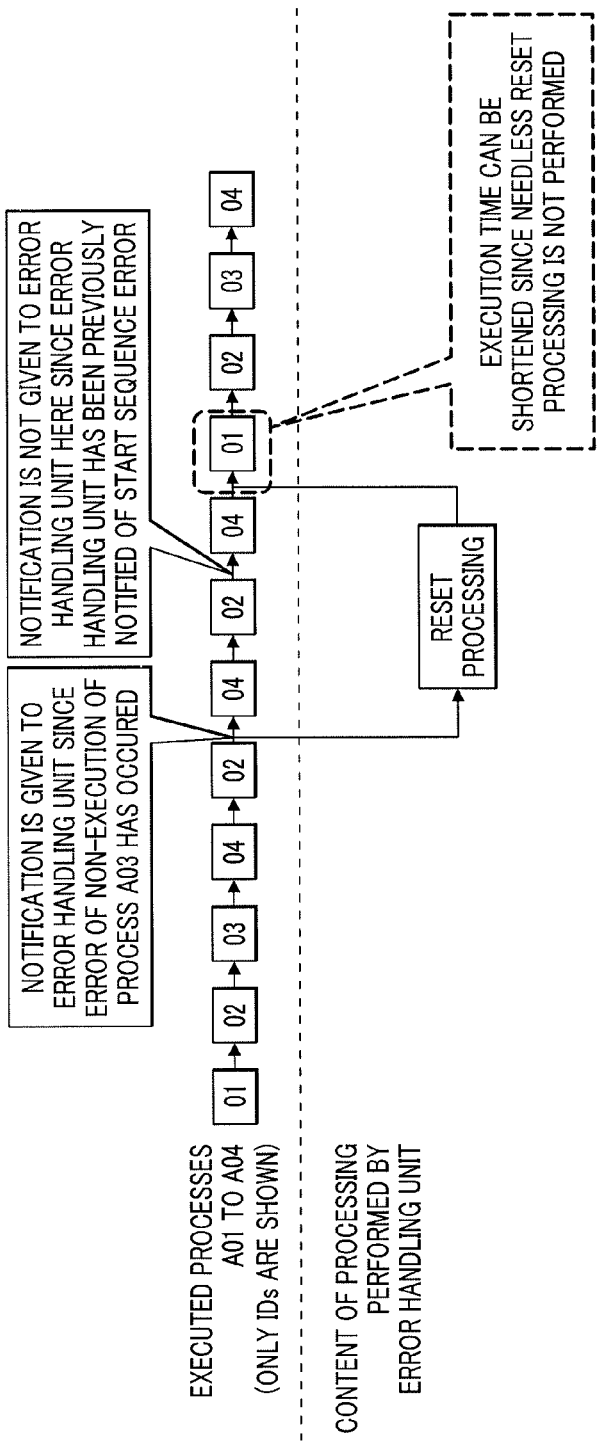
FIG. 10 is a schematic diagram for illustrating monitoring processing at the time of error handling.
Figure 11:
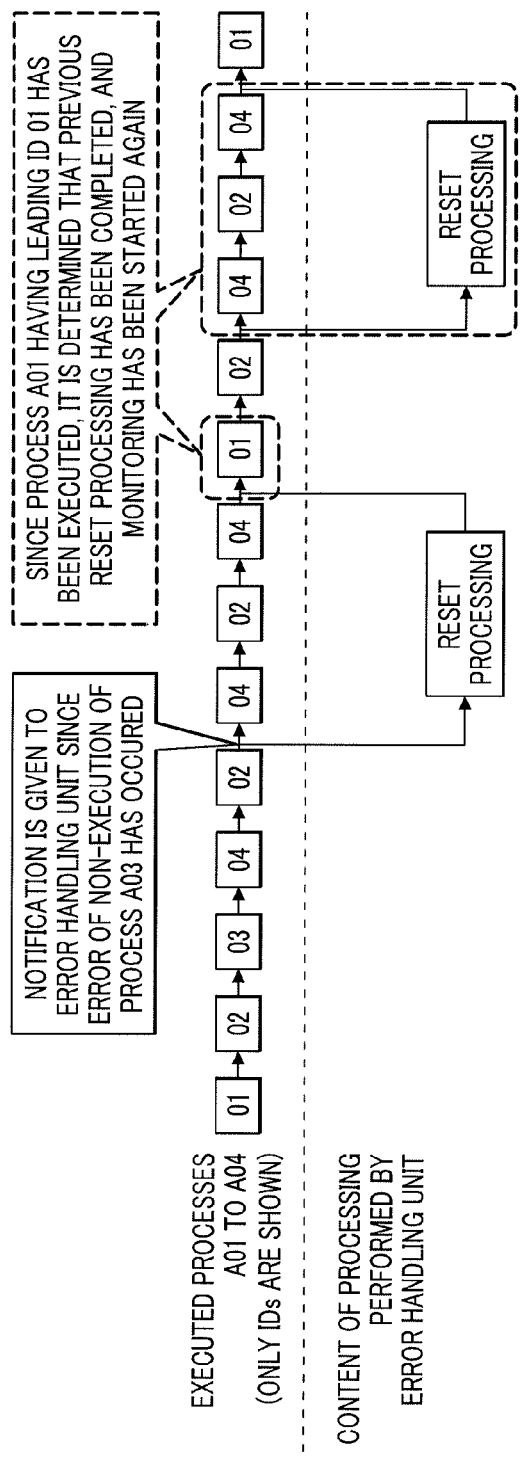
FIG. 11 is a schematic diagram for illustrating monitoring processing at the time of error handling.

For this reason, in the present embodiment, notification from the monitoring unit 30 to the error handling unit 40 is temporarily prohibited. FIG. 9 is a flowchart showing a procedure of execution sequence monitoring processing performed by the monitoring unit according to Embodiment 3, and FIGS. 10 and 11 are schematic diagrams for illustrating the monitoring processing at the time of error handling.

The execution sequence monitoring processing performed by the monitoring unit 30 will be described with reference to FIG. 9. When the controller 100 is initially started, data to be used in each unit is set to a preset value or the like. When the controller 100 is started, the monitoring unit 30 reads, for the respective series, the leading IDs from the execution sequence information 70 using the scheduled ID specifying unit 31, outputs the read leading IDs as the scheduled execution IDs to the ID determination unit 32, and starts monitoring processing.

The monitoring unit 30 acquires the identification information ID of the process to be executed that the ID determination unit 32 is notified of from the ID notification unit 22*a*, using the ID determination unit 32 (step S11). The ID determination unit 32 determines whether or not the identification information ID acquired from the ID notification unit 22*a* matches one of the scheduled execution IDs in the respective series that are input from the scheduled ID specifying unit 31 (step S12). If the ID determination unit 32 determines that there is no match (S12: NO), the ID determination unit 32 outputs the identification information ID that the ID determination unit 32 is notified of from the ID notification unit 22*a* to the handling determination unit 33, and the handling determination unit 33, upon acquiring the identification information ID from the ID determination unit 32, specifies the control app series to which the process with this identification information ID belongs (step S13). The handling determination unit 33 determines whether or not an error notification prohibition flag for the specified series is "1" (step S14). If the error notification prohibition flag is "1" (S14: YES), notification to the error handling unit 40 is prohibited, and the monitoring processing performed with respect to the single identification information ID that the ID determination unit 32 is notified of from the ID notification unit 22*a* ends. Note that the error notification prohibition flag is provided for each series, and is a value of "0" or "1". If the error notification prohibition flag is "0", error notification from the monitoring unit 30 to the error handling unit 40 is enabled, and if the error notification prohibition flag is "1", error notification from the monitoring unit 30 to the error handling unit 40 is prohibited.

If the result of the determination in step S14 is that the error notification prohibition flag is not "1" (S14: NO), the handling determination unit 33 notifies the error handling unit 40 of the series number of the specified series and the acquired identification information ID (step S15). The handling determination unit 33 sets the error notification prohibition flag of the specified series to "1" (step S16), and gives the scheduled ID specifying unit 31 an instruction to specify the scheduled execution ID as the leading ID. The scheduled ID specifying unit 31 specifies the scheduled execution ID in the specified series as the leading ID, based on the instruction (step S17), and the monitoring processing performed with respect to the single identification information ID that the ID determination unit 32 is notified of from the ID notification unit 22a ends. Note that the error handling unit 40 performs predetermined error handling, based on the series number and the identification information ID that are input from the handling determination unit 33.

If the ID determination unit 32 determines in step S12 that there is a match (S12: YES), the ID determination unit 32 outputs the identification information ID acquired from the ID notification unit 22a to the handling determination unit 33 and the scheduled ID specifying unit 31. The handling determination unit 33 determines whether or not the identification information ID acquired from the ID notification unit 22a is the leading ID in the series with the error notification prohibition flag "1" (step S18). If the handling determination unit 33 determines that the acquired identification information ID is the leading ID of the series with the error notification prohibition flag "1" (S18: YES), the handling determination unit 33 sets the error notification prohibition flag to "0" (step S19). Thus, prohibition of notification to the error handling unit 40 will be thereafter cancelled. If the acquired identification information ID is not the leading ID of the series with the error notification prohibition flag "1" (S18: NO), the error notification prohibition flag remains as it is.

If the determination result in step S18 is NO, or after processing in step S19, the scheduled ID specifying unit 31, upon acquiring the identification information ID that is output from the ID determination unit 32, determines whether or not the acquired identification information ID is the last ID (step S20). If the scheduled ID specifying unit 31 determines that the acquired identification information ID is not the last ID (S20: NO), the scheduled ID specifying unit 31 specifies the scheduled execution ID in the series including the matched identification information ID as a new ID obtained by adding the increment value C to the identification information ID acquired from the ID determination unit 32 (step S21). On the other hand, if the scheduled ID specifying unit 31 determines that the acquired identification information ID is the last ID (S20: YES), the scheduled ID specifying unit 31 specifies the scheduled execution ID in the series including the matched identification information ID as the repeat leading ID (step S22). After processing in steps S21 and S22, the newly specified scheduled execution ID is output from the scheduled ID specifying unit 31 to the ID determination unit 32, and the monitoring processing performed with respect to the single identification information ID that the ID determination unit 32 is notified of from the ID notification unit 22a ends.

The above-described processing will be described using a specific example with reference to FIGS. 10 and 11. When the process A04 is executed after execution of the process A02 in FIG. 10, the ID determination unit 32 outputs the identification information ID of the process A04 to the handling determination unit 33. The handling determination unit 33 specifies the series number of the acquired identification information ID as "1" in step S13. Assuming that the execution sequence error occurs for the first time, the error notification prohibition flags of all series are "0", and accordingly the determination result in step S14 is "NO". The handling determination unit 33 gives notification to the error handling unit 40 in step S15, and sets the error notification prohibition flag for the series number "1" to "1" in step S16. The scheduled ID specifying unit 31 specifies the scheduled execution ID for the series number "1" as the leading ID in step S17. It is assumed that the error handling unit 40 has output the reset processing request to the execution unit 20 with respect to the processing for the series number "1", based on the notification.

Next, after the identification information IDs of the processes A02 and A04 are output in sequence from the ID notification unit 22a to the ID determination unit 32, the ID determination unit 32 determines that there is no match in step S12, and outputs the identification information ID that the ID determination unit 32 is notified of from the ID notification unit 22a to the handling determination unit 33. The handling determination unit 33 specifies the series number as "1", based on the acquired identification information ID. Since the error notification prohibition flag for the series number "1" is currently "1" in the determination in step S14, the handling determination unit 33 ends the monitoring processing with respect to the processes A02 and A04 without giving notification to the error handling unit 40.

Next, when reset of the processes for the series number "1" performed by the execution unit 20 is complete and the identification information ID of the process A01 is output from the ID notification unit 22a to the ID determination unit 32, the ID determination unit 32 determines that there is a match in step S12, and outputs the identification information ID that the ID determination unit 32 is notified of from the ID notification unit 22a to the handling determination unit 33 and the scheduled ID specifying unit 31. The handling determination unit 33 determines in step S18 that the acquired identification information ID is the leading ID in the series with the error notification prohibition flag "1" in step S18, and sets the error notification prohibition flag to "0" in step S19. The scheduled ID specifying unit 31 determines whether or not the acquired ID is the last ID in step S20. Since the acquired ID is "01" corresponding to the process A01, the scheduled ID specifying unit 31 determines that the acquired ID is not the last ID, and adds, in step S21, the increment value C (=1) to the acquired ID to specify a new scheduled execution ID. The specified scheduled execution ID is output to the ID determination unit 32, and the monitoring processing performed with respect to the process A01 ends. At this stage, the monitoring processing has returned to a normal monitoring state in which notification to the error handling unit 40 is enabled as a result of the error notification prohibition flag having been returned to "0".

Thereafter, if the execution sequence error in which the process A04 is executed after the process A02 occurs again as shown in FIG. 11, notification is given from the monitoring unit 30 to the error handling unit 40, and the error handling unit 40 outputs the reset processing request to the execution unit 20.

As described above, according to the present embodiment, the error handling unit 40 is configured to give the execution unit 20 an instruction to restart the processes, based on the notification from the handling determination unit 33, and the handling determination unit 33 is configured to, after giving notification to the error handling 40, stop notification to the error handling unit 40 until the execution unit 20 executes the process to which the leading ID is assigned in the execution sequence. For this reason, it is possible to prevent a delay in restart due to an occurrence of an error in the repeat execution sequence before the processes are restarted.

Embodiment 4

Figure 12:
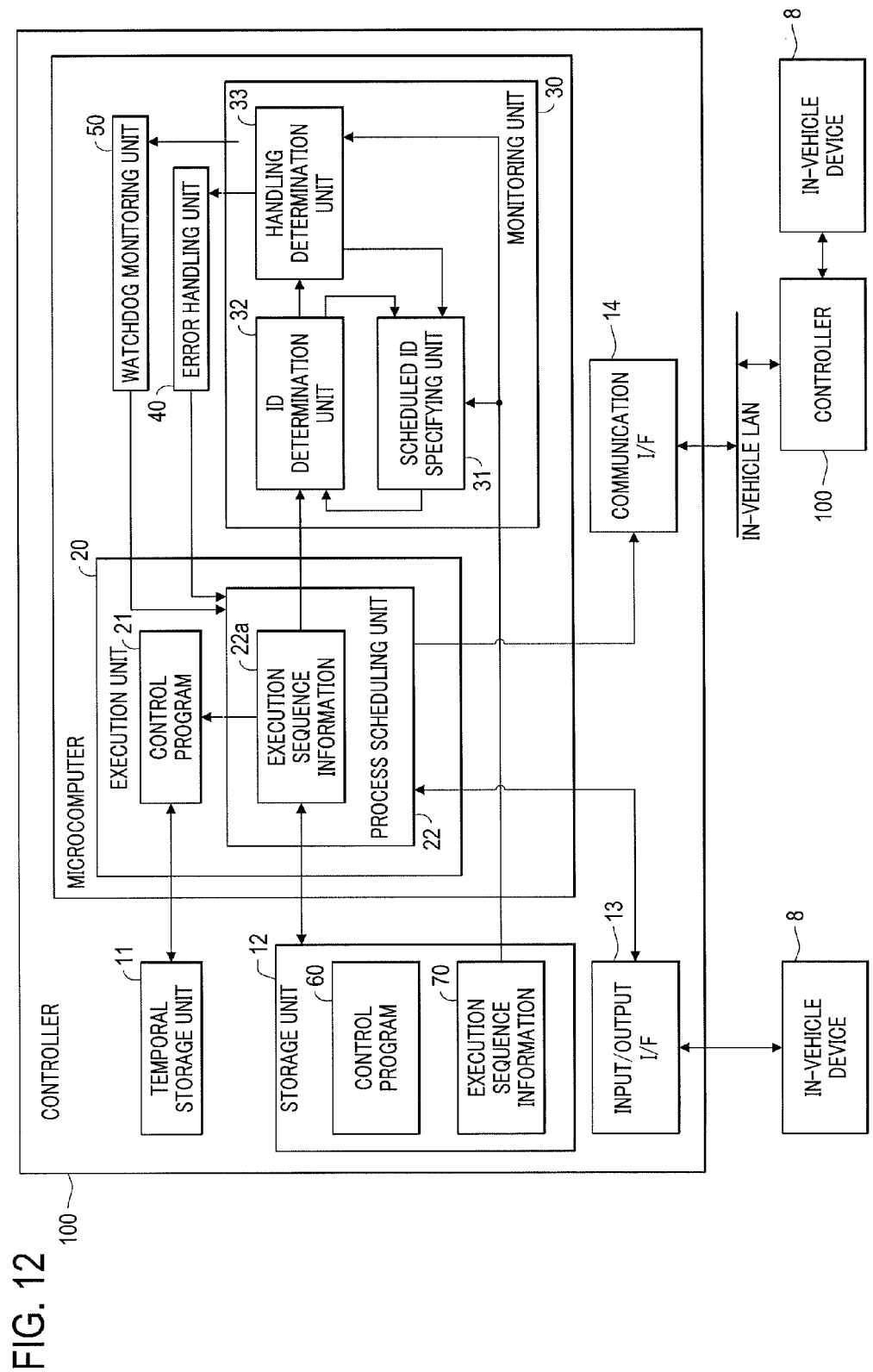
FIG. 12 is a block diagram showing a configuration of a controller according to Embodiment 4.

In Embodiment 4, a watchdog monitoring unit 50 is further added to the controller 100 according to the above-described embodiments. FIG. 12 is a block diagram showing a configuration of the controller 100 according to Embodiment 4. The watchdog monitoring unit 50 notifies the execution unit 20 of a restart of the processes if a signal to the watchdog monitoring unit 50 is not output from a monitoring target within a predetermined time period. The signal to the watchdog monitoring unit 50 is output from the monitoring unit 30. Note that the controller 100 according to Embodiment 4 is equivalent to the controller 100 according to the above-described embodiments except the feature described below, and the description of identical features will be omitted for the sake of simplification.

Figures 13, 14:
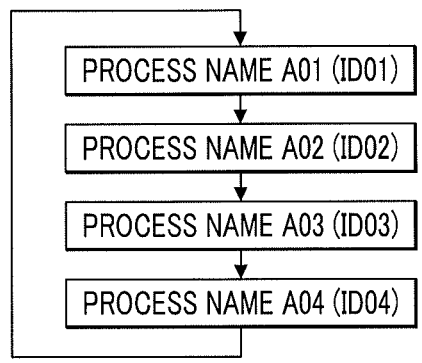
FIG. 13 is a schematic diagram for illustrating a prescribed execution sequence.
FIG. 14 is a schematic diagram for illustrating a setting of an output signal to a watchdog monitoring unit.

FIG. 13 is a schematic diagram for illustrating a prescribed execution sequence in the control app A 61, and FIG. 14 is a schematic diagram for illustrating a setting of an output signal to the watchdog monitoring unit 50. It is assumed, as an example, that an execution sequence is prescribed in which the processes A01 to A04 are sequentially repeated in the control app A 61. The monitoring unit 30 switches the output signal to the watchdog monitoring unit 50 to "0" when the process A01 (identification information ID 01) is executed, and switches the output signal to the watchdog monitoring unit 50 to "1" when the process A04 (identification information ID 04) is executed. Here, the identification information IDs of the processes A01 and A04 when the value of the output to the watchdog monitoring unit 50 is switched at the time of execution will be referred to as "watchdog IDs".

The watchdog monitoring unit 50 has a counter circuit having a predetermined bit number that is reset due to input (specifically, a rise of an input signal) of a reset signal, and gives the execution unit 20 an instruction to restart the processes when the reset signal is not input and the counter circuit overflows. Upon the process A04 having the aforementioned watchdog ID being executed, the monitoring unit 30 inputs the reset signal to the watchdog monitoring unit 50. Similarly for the other control app B 62 and the like, the execution sequence may be prescribed, the watchdog IDs may be set, and monitoring using the watchdog monitoring unit 50 may be performed with respect to each control app. For the sake of simplification, monitoring processing performed with respect to the control app A 61 by adding the watchdog monitoring unit 50 will now be described.

FIG. 15 is a flowchart showing a procedure of processing for outputting the signal to the watchdog monitoring unit 50. As in Embodiments 1 to 3 described above, the ID determination unit 32 acquires the identification information ID of the process to be executed from the ID notification unit 22a (step S31). The ID determination unit 32 determines whether or not the identification information ID acquired from the ID notification unit 22a matches the scheduled execution IDs, and also determines whether or not the identification information ID acquired from the ID notification unit 22a matches one of the watchdog IDs (step S32). If the ID determination unit 32 determines in step S32 that there is a match (S32: YES), the ID determination unit 32 outputs the identification information ID acquired from the ID notification unit 22a as the watchdog ID to the handling determination unit 33. The handling determination unit 33 outputs the output signal having a value corresponding to the identification information ID acquired from the ID determination unit 32 to the watchdog monitoring unit 50 (step S33), and ends the monitoring processing performed with respect to the single identification information ID that the ID determination unit 32 is notified of from the ID notification unit 22a. If the ID determination unit 32 determines in step S32 that there is no match (S32: NO), the ID determination unit 32 ends the monitoring processing performed with respect to the single identification information ID that the ID determination unit 32 is notified of from the ID notification unit 22a.

A specific example will now be described. Initially, upon being notified of the identification information ID 01 of the process A01 from the ID notification unit 22a, the ID determination unit 32 outputs the identification information ID 01 to the handling determination unit 33 since the result of the determination in step S32 is that the identification information ID matches the watchdog ID 01. The handling determination unit 33 outputs the output signal "0" corresponding to the identification information ID 01. Then, after the processes A02 and A03 are executed, the ID determination unit 32 does not perform output to the handling determination unit 33 since the identification information ID does not match the watchdog ID. Accordingly, the output from the handling determination unit 33 to the watchdog monitoring unit 50 remains "0".

After the process A04 is executed and the ID determination unit 32 is notified of the identification information ID 04 of the process A04 from the ID notification unit 22a, the ID determination unit 32 outputs the identification information ID 04 to the handling determination unit 33 since the result of the determination in step S32 is that the identification information ID matches the watchdog ID 04. The handling determination unit 33 switches the output signal to the output signal "1" corresponding to the identification information ID 04. Furthermore, after the process A01 is executed and the ID determination unit 32 is notified of the identification information ID 01 of the process A01 from the ID notification unit 22a, the ID determination unit 32 outputs the identification information ID 01 to the handling determination unit 33 since the result of the determination in step S32 is that the identification information ID matches the watchdog ID 01. The handling determination unit 33 switches the output signal to the output signal "0" corresponding to the identification information ID 04. Thus, as a result of execution of the process A04, the handling determination unit 33 outputs the reset signal to the watchdog monitoring unit 50. If the processes in the control app A 61 stop for some reason, the handling determination unit 33 cannot output the reset signal and the watchdog monitoring unit 50 notifies the execution unit 20 of restart of the control app A 61.

As described above, according to the present embodiment, when a specific identification information ID is output from the ID notification unit 22a, the handling determination unit 33 outputs the reset signal indicating that processes are continuing, and if the reset signal is not output within a predetermined time period, the watchdog monitoring unit 50 notifies the execution unit 20 of restart of the processes. Thus, in the case where processes in a control program stop for some reason, the processes in the program can be reset.

Embodiment 5

In Embodiment 4, in the controller 100 according to the above-described embodiments, execution sequence monitoring is performed on a control app that may be executed due to the state of the connected in-vehicle device 8, and execution sequence monitoring is not performed on a control app that is not executed. FIG. 16 is a schematic diagram for illustrating processing series that may be executed with respect to predetermined states of a device, in the controller 100 according to Embodiment 5.

For example, in a controller that controls the in-vehicle device 8 such as a door locking mechanism or an engine switch, when an engine key has not been inserted, a door control program may be executed but an engine start control program will not be executed. In FIG. 16, it is assumed that the control app A 61 is a door control program, and the control app B 62 is an engine start control program. It is determined whether each control app may be executed or not executed, based on a predetermined state (position) of the engine key, which is the device. The execution sequence of processes in the control app that may be executed is monitored, and the execution sequence of processes in the control app that is not executed is not monitored.

Specifically, in a state where the engine key has not been inserted, in a state where the engine key is at an OFF position, or in a state where the engine key is at an ACC position, the execution sequence of the processes in the control app A 61 is monitored, and the execution sequence of the processes in the control app B 62 is not monitored. In a state where the engine key is at an ON position or in a state where the engine key is at a START position, the execution sequences of the processes in both the control app A 61 and the control app B 62 are monitored. The state of the engine key can be detected as a result of signals from a switch for detecting that the engine key has been inserted and a switch for detecting that the engine key has been rotated and is at each position being input to the input-output I/F 13.

A table showing a correspondence relationship between predetermined states of the device and processing series that may be executed, such as the table shown in FIG. 16, is stored in advance in the storage unit 12. The monitoring unit 30 determines, based on this table, the control app on which monitoring of the execution sequence is to be performed, in association with the detected state of the engine key. The scheduled ID specifying unit 31 specifies the identification information of the processes in the determined control app on which monitoring of the execution sequence is to be performed.

As described above, the storage unit 12 stores the predetermined states of the in-vehicle device 8 and the processing series, among multiple series, that include the identification information of the processes that may be executed when the in-vehicle device 8 is in the respective predetermined states, in association with each other, and when the in-vehicle device 8 is in a predetermined state, the scheduled ID specifying unit 31 specifies the identification information IDs of processes to be executed by the execution unit 20, based on the execution sequence information regarding the series stored in the storage unit 12 in association with this predetermined state. Thus, it is possible to cause monitoring of the execution sequence not to be performed with respect to the processes that are not executed when the in-vehicle device 8 is in a predetermined state.

Furthermore, if the processes in the control app regarding which it has been determined that monitoring of the execution sequence is not performed in accordance with the state of the in-vehicle device 8 are executed, it will be deemed to be an abnormal state. For this reason, the monitoring unit 30 may be configured to monitor whether or not the processes in the control app regarding which it has been determined that monitoring of the execution sequence is not performed are executed. This can be described using a specific example shown in FIG. 16 as follows. When it has been detected that the engine key is at the OFF position, the control app B 62 is excluded from the target of execution sequence monitoring, but it is monitored whether or not the processes in the control app B 62 are executed.

For example, if the process B01 (ID05) is executed, the ID determination unit 32 is notified of the identification information ID 05 from the ID notification unit 22a, and accordingly the ID determination unit 32 outputs the identification information ID 05 to the handling determination unit 33 since the identification information ID 05 is not the scheduled execution ID specified by the scheduled ID specifying unit 31. The handling determination unit 33, upon specifying that the process B01 is a process in the control app B 62 based on the identification information ID, outputs the series number "2" of the control app B 62 and a notification signal indicating an occurrence of abnormal processing to the error handling unit 40. The error handling unit 40 performs error handling for the control app B 62. Specifically, the error handling unit 40 notifies the execution unit 20 of stop of the engine start control using the control app B 62. Thus, the execution sequence of the processes can be monitored, and in addition, it can also be monitored whether abnormal processing occurs, in accordance with the state of the in-vehicle device.

Note that in the above-described embodiments, the constituent units of a plurality of processes in each control app can be selected as appropriate in accordance with the configuration of the control app and the actual design of the execution sequence monitoring, and may be given in units of individual program parts (e.g., functionally consistent processes such as functions) having a small program scale, or may be processing units having a large program scale, such as a procedure or a task that combines program parts.

Note that the disclosed embodiments are examples in all aspects, and should be considered to be not restrictive. Further, although specific embodiments have been illustrated and described herein, those of ordinary skill in the art appreciate that any arrangement which is calculated to achieve the same purpose may be substituted for the specific embodiments shown and that embodiments of the invention have other applications in other environments. The present application is intended to cover any adaptations or variations of the present invention. The following claims are in no way intended to limit the scope of embodiments of the invention to the specific embodiments described herein.

LIST OF REFERENCE NUMERALS

100 Controller
12 Storage unit
20 Execution unit
22a ID notification unit (output unit)
30 Monitoring unit
31 Scheduled ID specifying unit (specifying unit)
32 ID determination unit (determination unit)
33 Handling determination unit (notifying unit signal output unit)
40 Error handling unit
50 Watchdog monitoring unit (second monitoring unit)

The invention claimed is:
1. A controller comprising:
an execution unit that executes a plurality of processes for controlling an operation of a device;
a monitoring unit that monitors an execution sequence of the processes executed by the execution unit;
an error handling unit; and
a storage unit that stores execution sequence information regarding multiple series based on identification information assigned to the processes, wherein the execution unit comprises an output unit that outputs the identification information assigned to the processes to be executed, and wherein the monitoring unit comprises:
- a specifying unit that obtains the execution sequence information regarding the multiple series from the storage unit and specifies, for each series, the identification information of the processes to be executed by the execution unit, based on the execution sequence information regarding the multiple series stored in the storage unit;
- a determination unit that determines whether or not the identification information output from the output unit matches the identification information specified for each series by the specifying unit, and outputs the matched identification information to the specifying unit if there is a match; and
- a notifying unit that notifies the error handling unit if it is determined by the determination unit that there is no match.

2. The controller according to claim 1, wherein the storage unit stores, for each series, a leading sequence number and a last sequence number in the execution sequence of the plurality of processes, as the execution sequence information, wherein the output unit outputs a sequence number serving as the identification information assigned to the processes to be executed, and wherein the specifying unit sequentially and repeatedly specifies, for each series, numbers from the leading sequence number to the last sequence number, as the identification information of the processes to be executed by the execution unit.

3. The controller according to claim 2, wherein the error handling unit gives the execution unit an instruction to restart the processes, based on the notification from the notifying unit, and wherein the notifying unit after giving the notification to the error handling unit, stops notification to the error handling unit until the execution unit executes a process to which a leading sequence number is assigned.

4. The controller according to claim 1, wherein the storage unit stores, for each series, a leading sequence number, a last sequence number, and a repeat leading sequence number in the execution sequence of the plurality of processes, as the execution sequence information, wherein the output unit outputs a sequence number serving as the identification information assigned to the processes to be executed, and wherein the specifying unit sequentially specifies, for each series, numbers from the leading sequence number to the last sequence number, and further, sequentially and repeatedly specifies numbers from the repeat leading sequence number to the last sequence number, as the identification information of the processes to be executed by the execution unit.

5. The controller according to claim 4, wherein the repeat leading sequence number is different from the leading sequence number.

6. The controller according to claim 1, wherein the monitoring unit comprises a signal output unit that outputs a signal indicating that the processes are continuing, when specific identification information is output from the output unit, and wherein the controller comprises a second monitoring unit configured to notify the execution unit of restart of the processes if the signal is not output within a predetermined time period.

7. The controller according to claim 1, wherein the storage unit stores a predetermined state of the device in association with a series, among the multiple series, that includes the identification information of the processes that may be executed when in the predetermined state, and wherein when the device is in the predetermined state, the specifying unit specifies the identification information of the processes to be executed by the execution unit, based on the execution sequence information regarding the series stored in the storage unit in association with the predetermined state.

8. The controller according to claim 1, wherein:

the execution unit executes at least one additional process for controlling an operation of the device, the at least one additional process not having an execution sequence prescribed; and no identification information is assigned to the at least one additional process.

9. The controller according to claim 1, wherein the identification information comprises a group of numbers provided for each series, and wherein the numbers are integer values with a fixed increment value arranged in ascending or descending order.

10. The controller according to claim 1, wherein the error handling unit executes predetermined error handling based on a result of monitoring by the monitoring unit.

11. A process monitoring method comprising:

executing, using an execution unit, a plurality of processes for controlling an operation of a device;

monitoring an execution sequence of the processes executed by the execution unit;

storing, in a storage unit, execution sequence information regarding multiple series based on identification information assigned to the processes;

outputting the identification information assigned to the processes to be executed by the execution unit;

obtaining the execution sequence information regarding the multiple series from the storage unit and, for each series, specifying, using a specifying unit, the identification information of the processes to be executed by the execution unit, based on the execution sequence information regarding the multiple series stored during the storing;

determining whether or not the identification information output in the output step matches the identification information specified for each series, and outputting the matched identification information to the specifying unit if there is a match; and notifying, by giving a notification, an error handling unit if it is determined during the determining that there is no match.

12. The process monitoring method according to claim 11, wherein the storing comprises storing, for each series, a leading sequence number and a last sequence number in the execution sequence of the plurality of processes, as the execution sequence information, wherein the outputting comprises outputting a sequence number serving as the identification information assigned to the processes to be executed, and wherein the specifying comprises sequentially and repeatedly specifying, for each series, numbers from the leading sequence number to the last sequence number, as the identification information of the processes to be executed by the execution unit.

13. The process monitoring method according to claim 12,
wherein the error handling unit gives the execution unit an instruction to restart the processes, based on the notification, and
wherein after the notification is given to the error handling unit, notification to the error handling unit is stopped until the execution unit executes a process to which a leading sequence number is assigned.

14. The process monitoring method according to claim 11,
wherein the storing comprises storing, for each series, a leading sequence number, a last sequence number, and a repeat leading sequence number in the execution sequence of the plurality of processes, as the execution sequence information,
wherein the outputting comprises outputting a sequence number serving as the identification information assigned to the processes to be executed, and
wherein the specifying comprises sequentially specifying, for each series, numbers from the leading sequence number to the last sequence number, and further, sequentially and repeatedly specifying numbers from the repeat leading sequence number to the last sequence number, as the identification information of the processes to be executed by the execution unit.

15. The process monitoring method according to claim 14, wherein the repeat leading sequence number is different from the leading sequence number.

16. The process monitoring method according to claim 11, further comprising:
indicating, by an output signal, that the processes are continuing, when specific identification information is output during the output step, and
when the output signal is not indicated within a predetermined time period, notifying the execution unit of restart of the processes.

17. The controller according to claim 11,
wherein the storing comprises storing a predetermined state of the device in association with a series, among the multiple series, that includes the identification information of the processes that may be executed when in the predetermined state, and
wherein when the device is in the predetermined state, specifying the identification information of the processes to be executed by the execution unit, based on the execution sequence information regarding the series stored during the storing in association with the predetermined state.

18. The process monitoring method according to claim 11, wherein:
the execution unit executes at least one additional process for controlling an operation of the device, the at least one additional process not having an execution sequence prescribed; and
no identification information is assigned to the at least one additional process.

19. The process monitoring method according to claim 11,
wherein the identification information comprises a group of number provided for each series, and
wherein the numbers are integer values with a fixed increment value arranged in ascending or descending order.

20. The process monitoring method according to claim 11, wherein the error handling unit executes predetermined error handling based on a result of monitoring by the monitoring unit.

21. A controller comprising:
an execution unit that executes a plurality of processes for controlling an operation of a device;
a monitoring unit that monitors an execution sequence of the processes executed by the execution unit;
an error handling unit; and
a storage unit that stores execution sequence information regarding multiple series based on identification information assigned to the processes,
wherein the execution unit comprises an output unit that outputs the identification information assigned to the processes to be executed, and
wherein the monitoring unit comprises:
a specifying unit that specifies, for each series, the identification information of the processes to be executed by the execution unit, based on the execution sequence information regarding the multiple series stored in the storage unit;
a determination unit that determines whether or not the identification information output from the output unit matches the identification information specified for each series by the specifying unit; and
a notifying unit that notifies the error handling unit if it is determined by the determination unit that there is no match;
wherein the storage unit stores, for each series, a leading sequence number and a last sequence number in the execution sequence of the plurality of processes, as the execution sequence information,
wherein the output unit outputs a sequence number serving as the identification information assigned to the processes to be executed, and
wherein the specifying unit sequentially and repeatedly specifies, for each series, numbers from the leading sequence number to the last sequence number, as the identification information of the processes to be executed by the execution unit.

* * * * *